Jan. 3, 1928.

P. L. J. MIGUET 1,655,324

ELECTRIC FURNACE

Filed Sept. 29, 1926

Witnesses

Henry Germain
Jean Manreau

Inventor

Paul Louis Joseph Miguet

Jan. 3, 1928.
P. L. J. MIGUET
1,655,324
ELECTRIC FURNACE
Filed Sept. 29, 1926
2 Sheets-Sheet 2
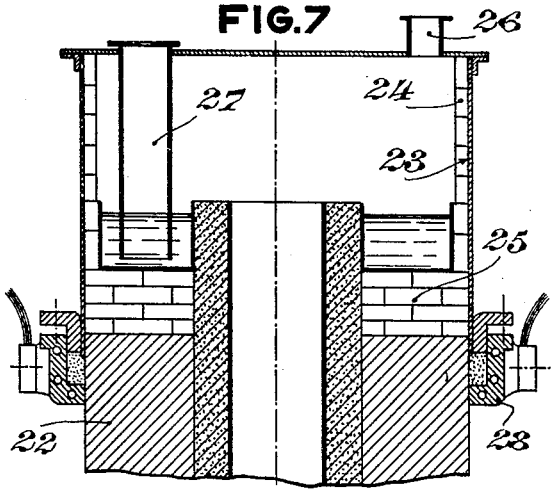
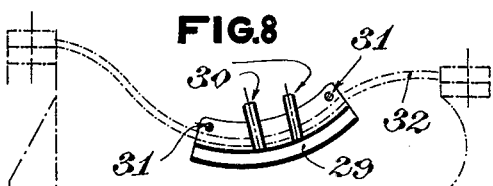
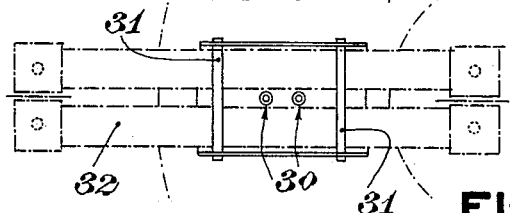
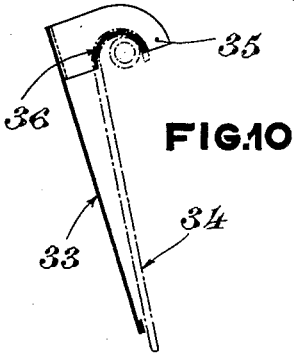
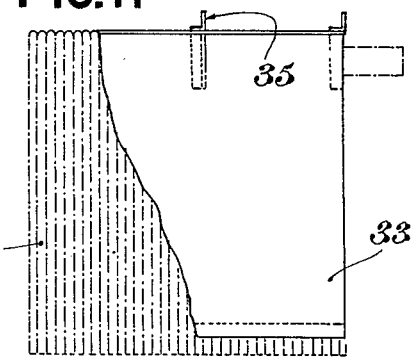
Witnesses
Inventor Patented Jan. 3, 1928.

1,655,324

UNITED STATES PATENT OFFICE.

PAUL LOUIS JOSEPH MIGUET, OF ST.-JULIEN-DE-MAURIENNE, FRANCE, ASSIGNOR TO SOCIETE ELECTROMETALLURGIQUE DE MONTRICHER, OF ST.-JULIEN-DE-MAURIENNE, FRANCE.

ELECTRIC FURNACE.

Application filed September 29, 1926, Serial No. 138,540, and in France December 31, 1925.

This invention relates to electric reducing furnaces and more especially to the economic running of high power furnaces with high production.

According to one object of the invention, sandwiched conductors, connecting the base of the furnace body and the electrode are arranged in ducts or flues arranged outside the furnace walls, a current of cooling air circulating through said ducts, without the air entering the furnace lining and means being provided for supporting the ducts and their cooperating parts independently of the furnace body.

The exterior ducts allow for the suppression of all danger of the igniting of air in the combustible portion of the apparatus, for the arrangement of transformers on the sides of or under the furnace and the free access to the upper portion of the furnace.

According to a second object of the invention, the walls of the furnace body are surrounded by a water-cooled lining and by a metal sleeve, preferably lead, rendered airtight by autogeneous welding when in place, allowing the suppression of all heat radiation in the lower part of the furnace, the prevention of expansion of the walls, the gradual wearing away of the apparatus and, finally, the prevention of the entrance of stray air, capable of provoking slow combustion in the flue.

According to a third object of the invention, the furnace body is supported by a hollow pillar, preferably of reinforced concrete, through holes, provided in its top, cooling air is blown, which passes then through the exterior ducts.

Other objects of the invention will appear in the description with reference to the accompanying drawings, given by way of example.

Fig. 7 is a sectional elevation of a hollow electrode.

Figs. 8 and 9 show respectively a sectional plan and elevation of a protecting shield.

Figs. 10 and 11 are respectively a side elevation and half sectional elevation of the means for holding the sheet iron screen away from the rods.

Figure 1:
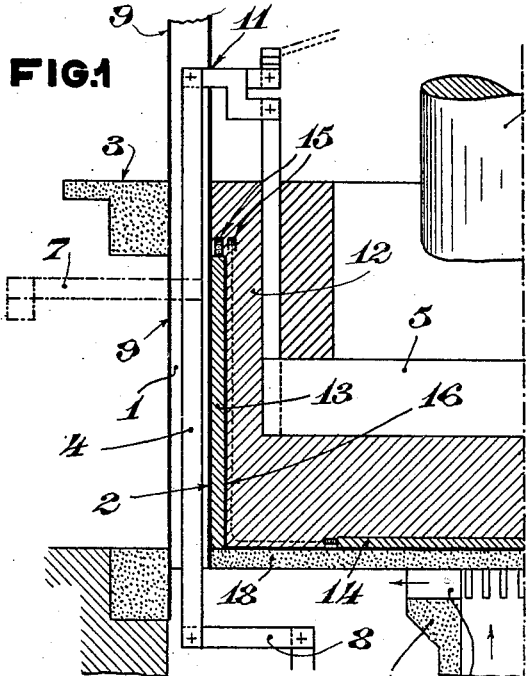
Figs. 1 and 2 are respectively a vertical half section and a part section on a plane mid-way up the chamber of an electric furnace.
Figure 2:
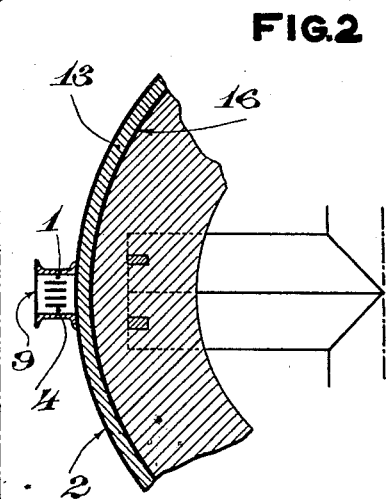

Figs. 1 and 2 show a duct 1 preferably arranged along a metal plate 2 projecting below the floor 3 supporting the apparatus independently of the furnace walls improving the service including the sandwiched conductors 4 connecting the base of the chamber 5 and the electrode 6 through a lateral transformer introduced at 7 or through a transformer at 8. The sheet iron plates 9 are arranged in such a way that air blown through them at 10 passes through the chamber containing the transformers, passes over them and escapes at 11 without there being any chance of its entering the lining 12.

Cooling plates 13 and 14 in contact with water circulation tubes 15 project at the upper level of the furnace where they are provided with inlet and outlet connections only taking up enough room transversely inside the walls for the necessary cooling of the lead sleeve 16 made airtight by soldering in situ. The sleeve 16 is so arranged that the vertical plates lying adjacent to them, project at their upper ends and cannot cut them with their rough lower edges as these are sunk.

The side and end plates naturally form on the one hand a casing only hollow to the right of the cast chamber and on the other a plane disc concentric with the oven so that uniform cooling is obtained.

A hollow pillar 17 the height of which varies according as to whether the transformers are arranged laterally or on end allows for a considerable reduction in the importance of the reinforced lining 18 and consequently increases the efficiency of the supplementary air cooling through the ducts 1 regulated by the dampers 10.

Figures 3, 5:
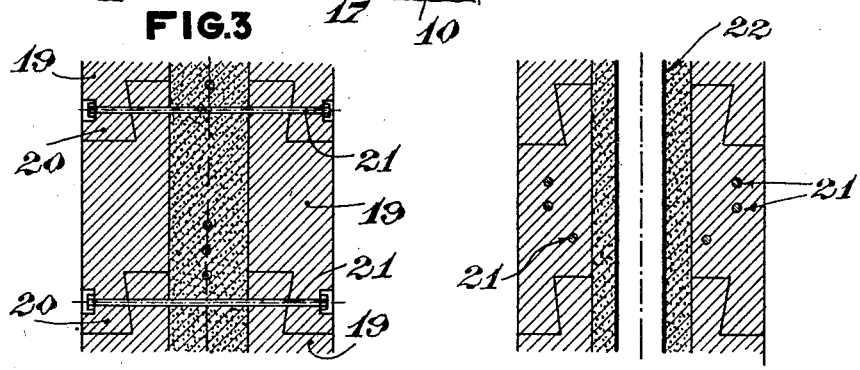
Figs. 3 and 4 are section elevation and sectional plan of a continuous electrode.
Figs. 5 and 6 are similar views showing a modification of a hollow electrode.
Figure 4:
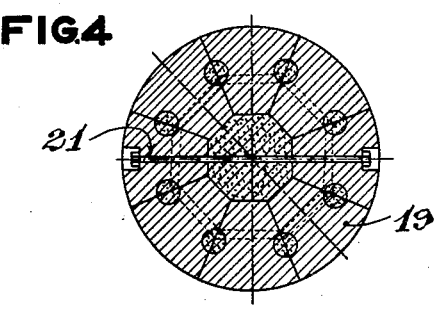

Figs. 3 and 4 show respectively a sectional elevation and plan of a continuous electrode built up from sections, preferably slotted segments 19, dovetailed together at 20 and secured by bolts 21 having countersunk nuts at both ends. The filling of the slots between the segments and a central channel with powdered carbon is only done the last thing.

Figure 6:
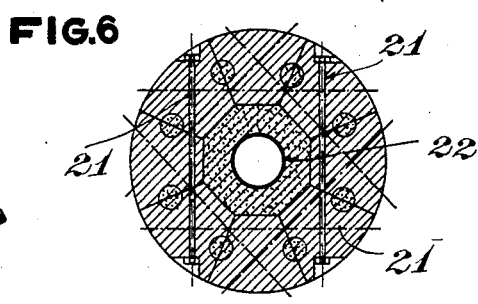

The similar Figs. 5 and 6 show a modified arrangement having transverse bolts 21 and a central passage lined with a metal tube 22' for the passage of gas and vapour from the furnace.

Fig. 7 is a vertical section of a hollow electrode 22 formed in segments held in position by lateral bolts but discontinuous as it has a condensing chamber 23 preferably provided with a suitable interior lining 24 separated from the electrode by a refractory wall 25 of variable thickness. The suction of the gas and vapour is maintained by a pipe 26 the exhaustion of the condensed products being through a tube inserted into the passage 27. The electromechanical continuity of the whole is assured by a cooled ring 28 formed with powdered carbon on the face next to the base electrode and the base of the condenser casing.

Figs. 8 and 9 show respectively a sectional elevation and plan of the protecting shield having a double bottom 29 water cooled through tubes 30 and supported by rods 31 resting directly on the leads 32.

Figs. 10 and 11 show respectively a side elevation and a half sectional elevation of a sheet iron screen 33 preferably mounted on hanging rods 34 by lugs 35 and affixed thereto by a washer 36. The exterior duplication of the screens allows for a better efficiency of the hanging rods, without deformation of the sheet screens, which are not subjected to the direct radiation of the furnace.

What I claim as my invention and desire to protect by Letters Patent is:—

1. An electric reducing furnace comprising ducts arranged outside the walls sandwiched conductors disposed within the ducts whereby these latter may be air cooled without the air entering the furnace lining, transformer chambers in the ducts and means for supporting the apparatus independently of the furnace walls.

2. A cylindrical electric reducing furnace as in claim 1 having cooling plates and a lead sleeve arranged around the outer walls thereof at the sides and front.

3. An electric reducing furnace as in claim 1 having a hollow pillar through which air can be blown supporting the walls and the high tension apparatus.

4. An electric reducing furnace as in claim 1 having screens of hanging rods and corrugated sheet iron.

5. An electric reducing furnace, comprising an electrode extending downwards in a chamber, ducts arranged outside the walls of said chamber, sandwiched conductors disposed within said ducts, means for blowing a draught of cooling air through said ducts and means for supporting the ducts and their cooperating parts independently of said walls.

6. An electric reducing furnace, comprising an electrode extending downwards in a chamber, ducts arranged outside the walls of said chamber, sandwiched conductors disposed within said ducts, transformer chambers communicating with said ducts, means for blowing air through said ducts and said transformer chamber without the air entering the walls of said chamber and means for supporting the ducts and their cooperating parts independently of said walls.

7. An electric reducing furnace comprising an electrode extending downwards in a chamber, air cooled ducts arranged outside the walls of said chamber, sandwiched conductors disposed within said ducts, means for supporting the ducts and their cooperating parts independently of said walls and a lining of water cooled plates arranged at the outside of said walls.

8. An electric reducing furnace comprising an electrode extending downwards in a chamber, air cooled ducts arranged outside the walls of said chamber, sandwiched conductors disposed within said ducts, means for supporting the ducts and their cooperating parts independently of said walls a lining of water cooled plates arranged at the outside of said walls and an air-tight metal sleeve embedded in said walls.

9. An electric reducing furnace comprising an electrode extending downwards in a chamber, a pillar supporting the walls of said chamber air cooled ducts arranged outside said walls, sandwiched conductors disposed within said ducts, means, independent of said pillar, for supporting the ducts and their cooperating parts.

10. An electric reducing furnace comprising an electrode extending downwards in a chamber, a hollow pillar supporting the walls of said chamber, ducts arranged outside said walls, sandwiched conductors disposed within said ducts, transformer chambers communicating with said ducts, means for blowing air through the hollow pillar, the ducts and the transformer chambers and means, independent of said pillar, for supporting the ducts and their cooperating parts.

11. An electric reducing furnace comprising a tubular electrode extending downwards in a chamber, sandwiched air cooled conductors arranged in ducts outside the walls of said chamber and supported independently of said walls, a condensation chamber arranged above said electrode, a tube therefrom for drawing vapors from said condensation chamber and a second tube therefrom through which condensed products are exhausted.

12. An electric reducing furnace comprising an electrode extending downwards in a chamber, sandwiched air cooled conductors arranged in ducts outside the walls of said chamber and supported independently of said walls hanging rods forming screens and sheet iron screens freely mounted on said hanging rods.

In witness whereof I affix my signature.

PAUL LOUIS JOSEPH MIGUET.